United States Patent [19]

Lockwood

[11] Patent Number: 4,929,124
[45] Date of Patent: May 29, 1990

[54] METHOD AND APPARATUS FOR CONSTRUCTING AND MOVING LONG PIPELINES

[75] Inventor: George S. Lockwood, Carmel Valley, Calif.

[73] Assignee: Ocean Farms of Hawaii Limited Partnership, Hi.

[21] Appl. No.: 225,248

[22] Filed: Jul. 28, 1988

[51] Int. Cl.⁵ ............................................. F16L 1/04
[52] U.S. Cl. ................................ 405/165; 405/158; 405/168; 405/172
[58] Field of Search ............... 405/158, 165, 166, 168, 405/172

[56] References Cited

U.S. PATENT DOCUMENTS

| | | |
|---|---|---|
| 2,731,800 | 1/1956 | Collins .......................... 405/171 X |
| 3,010,214 | 11/1961 | Postlewaite ..................... 166/355 X |
| 3,890,693 | 6/1975 | Eagleton et al. .................... 29/429 |
| 4,102,142 | 7/1978 | Lee ................................ 405/171 X |
| 4,191,492 | 3/1980 | Cobbs ................................ 405/133 |
| 4,778,306 | 10/1988 | Anselmi et al. ..................... 405/171 |
| 4,798,500 | 1/1989 | Morton .............................. 405/158 |

FOREIGN PATENT DOCUMENTS 2345389 10/1977 France ................................ 405/158

Primary Examiner—Randolph A. Reese
Assistant Examiner—Arlen L. Olsen

[57] ABSTRACT

This invention provides a plurality of bearing stations in conjunction with traction and braking means to assemble and launch long pipelines where prior assembly and rapid installation are required. A method including prediction of wind, current, and other water forces, is provided for launching submerged pipelines.

28 Claims, 5 Drawing Sheets

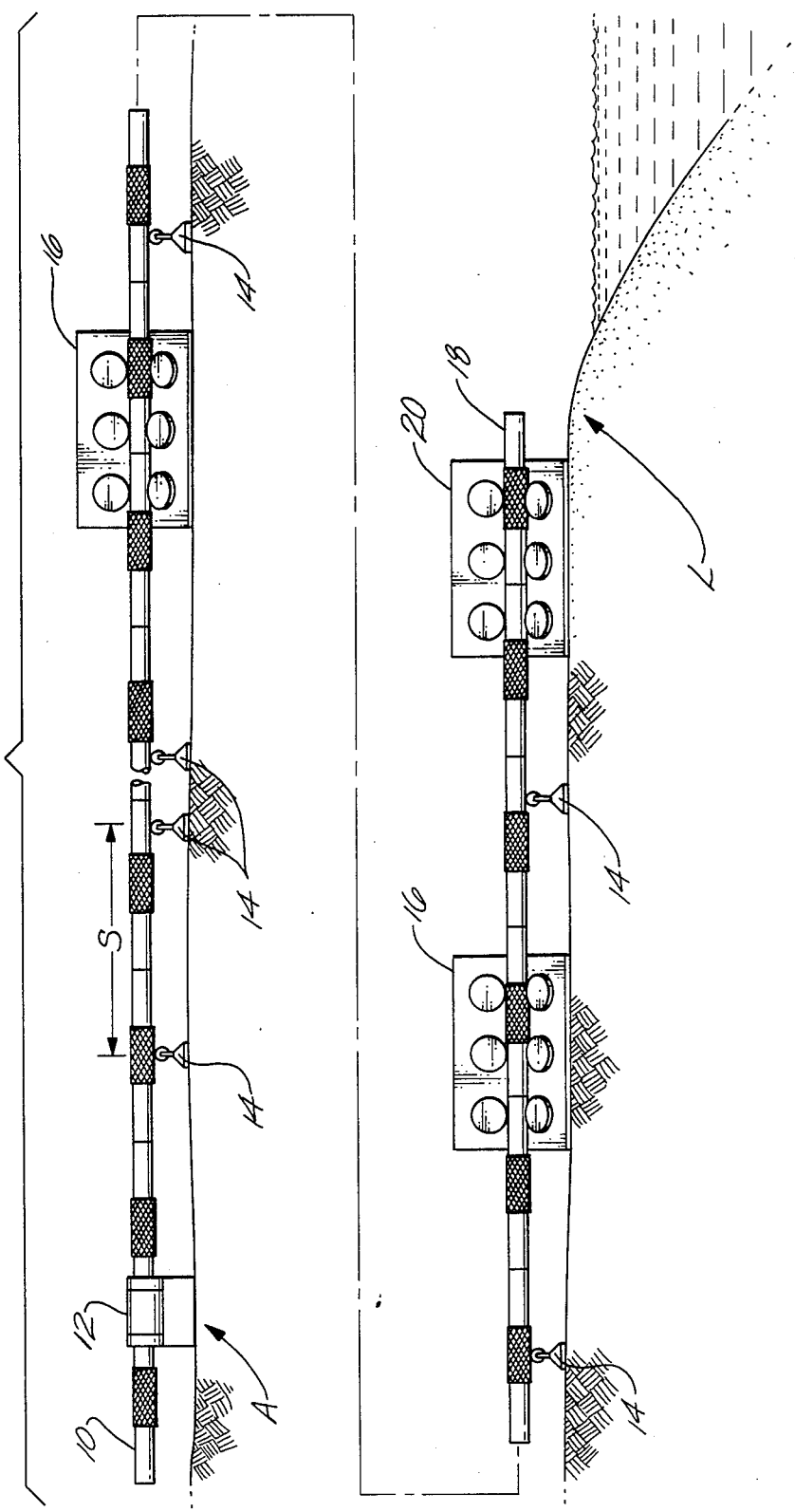

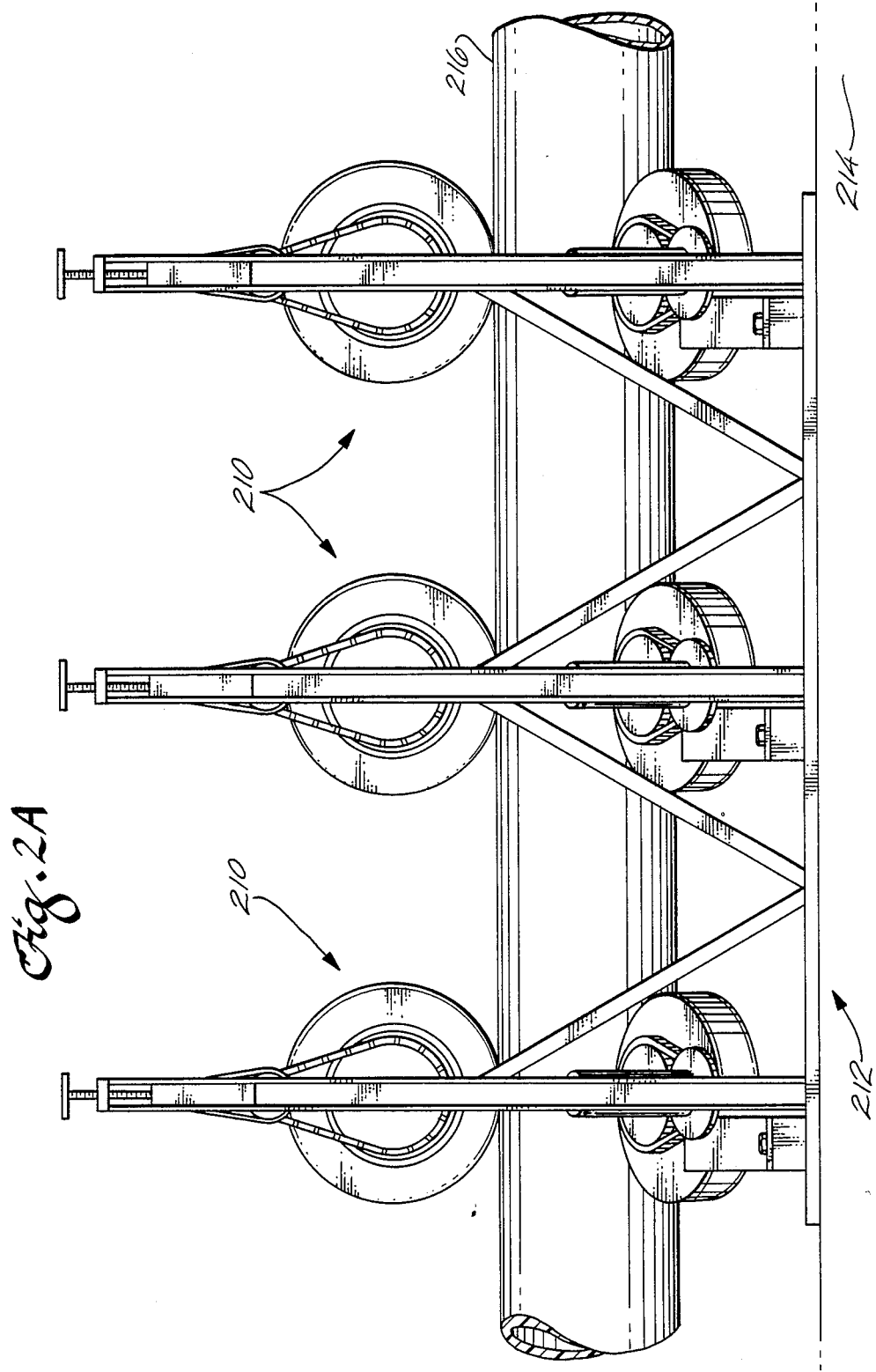

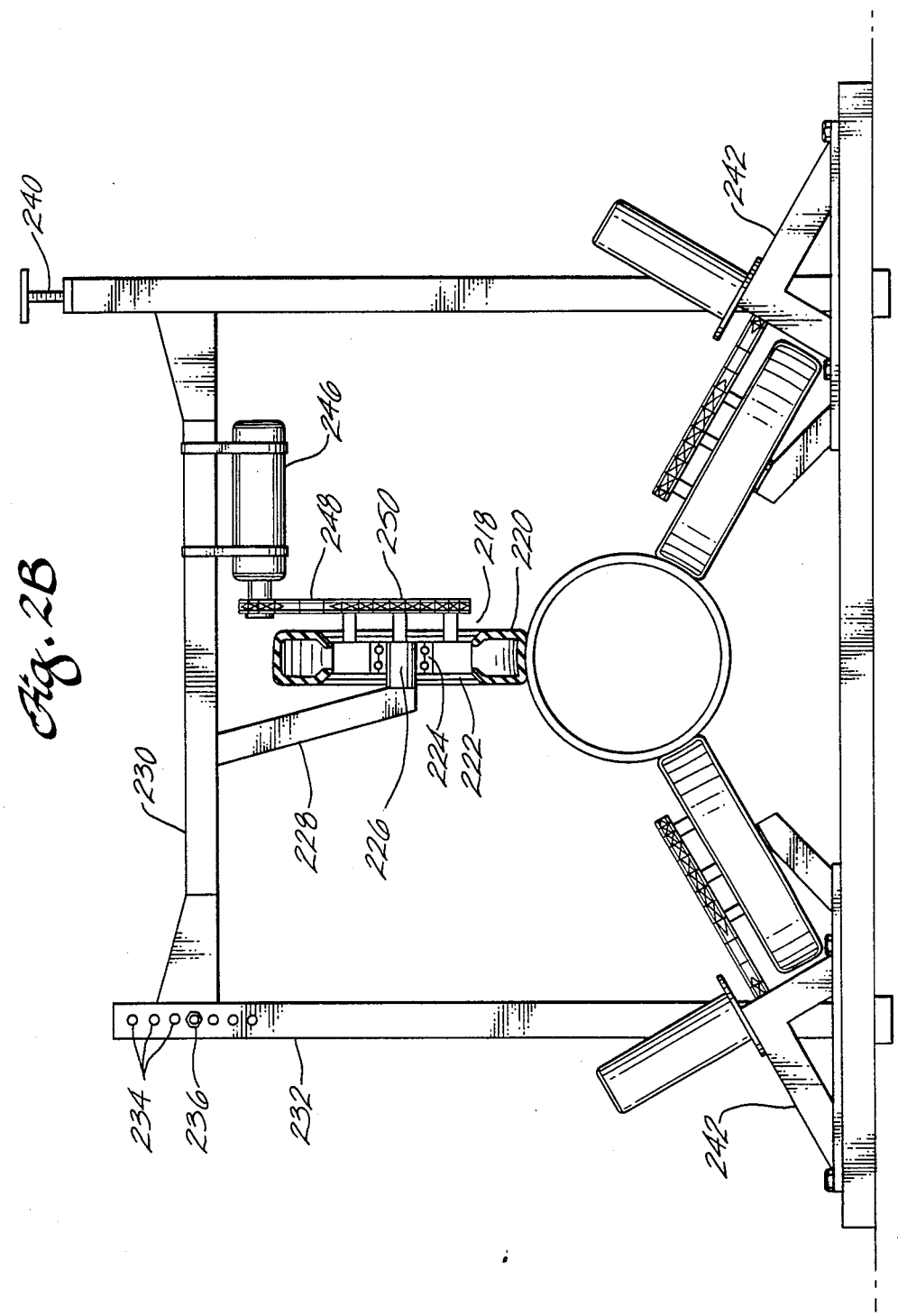

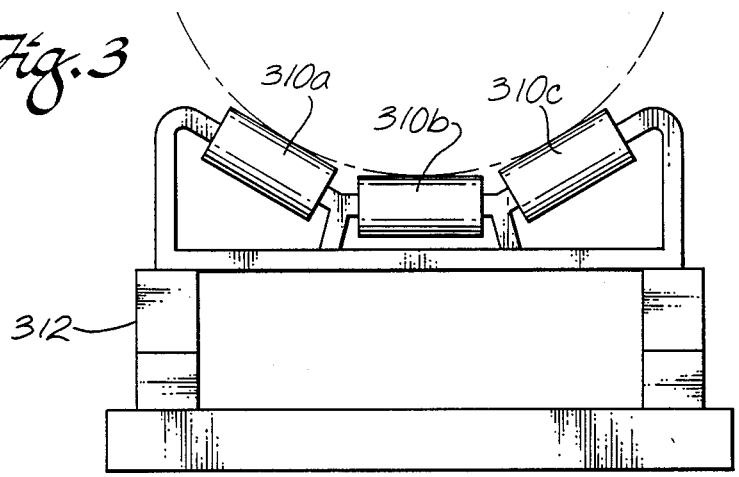
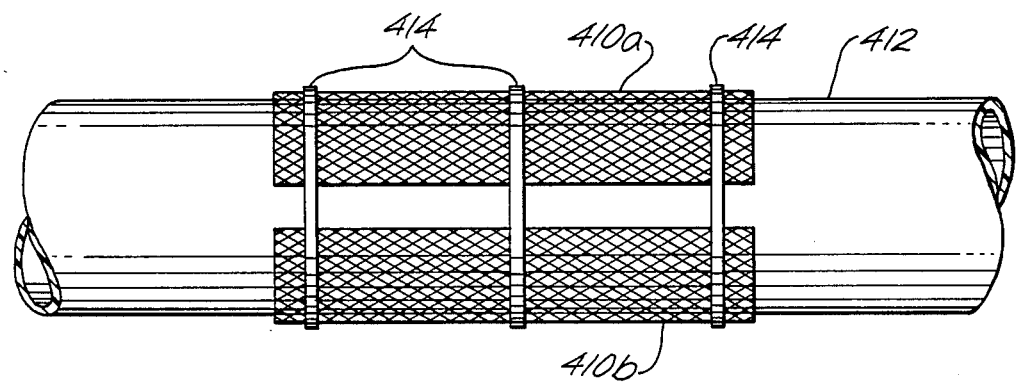
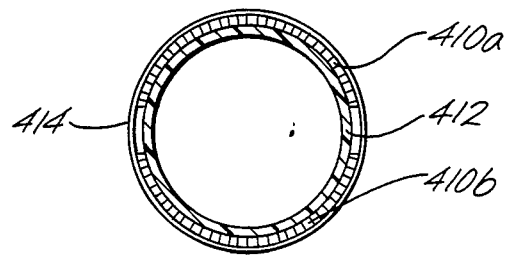

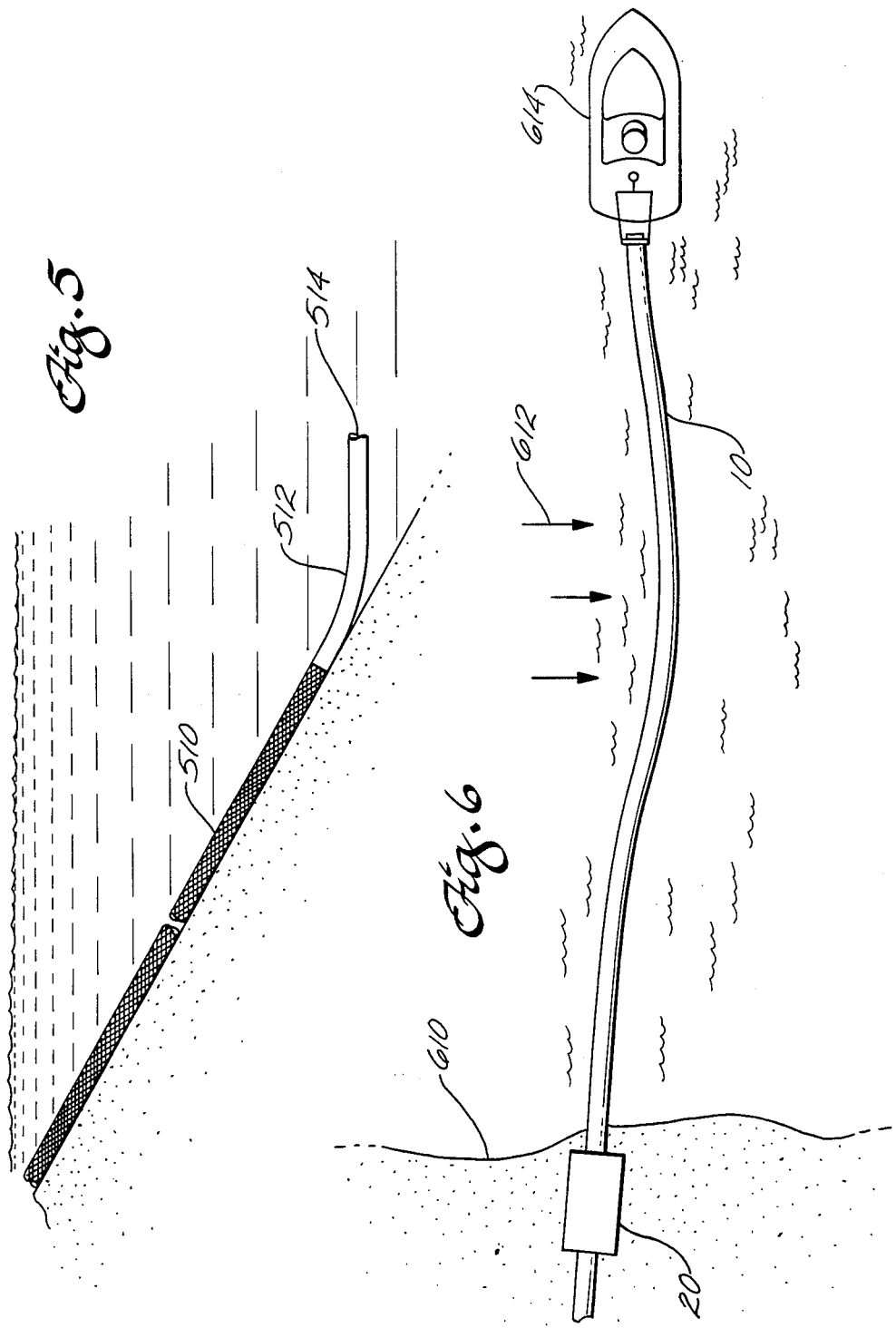

METHOD AND APPARATUS FOR CONSTRUCTING AND MOVING LONG PIPELINES

FIELD OF THE INVENTION

The invention relates generally to the installation of pipe strings of extended length. More particularly the invention relates to the complete assembly of a long pipe string which may be exposed to adverse environmental conditions during installation as a single unit which is then rapidly installed as a single preassembled unit.

BACKGROUND OF THE INVENTION

Installation of pipe strings with lengths ranging from 2,000 to 6,000 feet where environmental conditions or other installation constraints impact the structural integrity of the pipe string has long been a problem for pipeline construction engineers. An example of this type of pipeline installation is installation of deep seawater pumping pipelines. Pipelines which are installed to obtain cold biologically inactive seawater from depths of 2,000 feet or below are used in applications such as power generation by ocean thermal energy conversion (OTEC) and mariculture applications requiring cold biologically inactive ocean water which is free of industrial, agricultural, and human pollution and unwanted forms of life.

Deep ocean-water pipelines of this type require a length of approximately 6,000 feet or longer. Such pipes are placed in locations where there is a steep slope of seafloor such as off volcanic islands where the seafloor may reach a depth of 2,000 feet for a 6,000 foot long pipe. Very few such deep ocean-water pipelines have been constructed. One such pipeline was constructed in Cuba during the 1930's by G. Claude for generation of electrical power using thermal difference between surface and deep ocean water based on theories developed by the French physicist D'Arsonval. However, this pipeline was destroyed shortly after installation by a hurricane.

The first such pipeline known to be in continuous service exists at the Natural Energy Laboratory of Hawaii. This prior art installation comprises a 12-inch pipeline moored by anchor bolts to the seafloor in the shallow depths of its length. At greater depths the pipe is held in place by cables connected to battleship anchors at two locations, one of which is near the termination of the pipe. The 12-inch pipeline is constructed of high-density polyethylene (HDPE) and is slightly buoyant even when filled with seawater. The pipeline therefore floats in an inverted catenary position connected between the two battleship anchor and cable arrangements. Installation of this pipe required extensive use of heavy equipment necessary for handling the heavy anchors, and this installation involved operating at sea over a period of several days.

Launching of such pipelines requires assembly and sinking of the pipe. In the prior art, assembly of the pipeline was accomplished using several different techniques. One example technique involved incrementally connecting pipe sections to form subsections of the completed pipe of approximately 2,000 feet in length by installing short pipe sections and floating the increasing length of pipe in the lee of a breakwater for protection from ocean currents and other natural forces such as wave action during assembly. The individual subsections were then towed to sea, aligned and interconnected in the open sea.

Interconnection required the use of large seagoing crane equipment or complex attachment methods to preclude premature flooding and sinking of the pipe. Additionally, the assembly of the subsections and towing of the completed pipe to its final installation location were conducted in the open sea, exposing the pipeline to ocean currents and meteorological conditions with a significant chance of damage or loss.

The cost of installing such pipelines using the prior art techniques is extremely high due to the requirement for tug boats, cranes, and other heavy oceangoing equipment and extensive use of divers for significant periods of time.

A method and apparatus is desired which reduces the cost and risk for installation of such deep water pipes. Avoiding such long-term exposure to ocean forces which may cause structural damage to or loss of a pipe during installation and the elimination of extended time and heavy equipment requirements assists in achieving this goal.

SUMMARY OF THE PRESENT INVENTION

A method and apparatus for constructing and moving long pipelines is provided by the present invention. Pipe sections are assembled on land to form the total length of needed pipe. Potential forces on the pipe during launching due to sea currents and winds are predicted to determine a time period during which forces will be sufficiently low to permit safely launching the pipe. The preconstructed pipe is then launched during the favorable time period substantially continuously in a sufficiently short time to complete the operation within the time range of the prediction.

To accomplish this intended result, the invention provides an apparatus for assembling and moving the long pipe, comprising a means for connecting individual pipe sections which is located at a point displaced from the location of the launching of the pipe a distance essentially equal to the total length of the pipe. A plurality of bearing stations are arranged between the launch point and the means for connecting the pipe sections to bear the weight of the pipe and allow mobility of the pipe. Traction means for moving the pipe along the bearing means are provided between the connection means and the launch point.

Individual sections of pipe are joined at the connection means and moved along the bearings until substantially the entire length of pipe is complete. Prior to and during assembly of the pipe, meteorological and ocean current data are gathered at the launch point to provide a prediction database for currents and winds. Upon completion of assembly of the pipe, meteorological, current and oceanographic condition predictions are made to determine the optimum launching time for the pipe assembly.

The pipe is then launched by urging the assembly along the bearings with the traction means assisted by a tug boat or other appropriate marine vehicle for guiding the end of the pipe from the launch point and providing additional extraction force. The pipe is drawn substantially continuously along the bearing means and into the water from the launching point to minimize the time required, thereby precluding changing of the predicted currents and winds, minimizing risks of damage or loss.

If it should become apparent during the lauch of the pipe that forecasted conditions are changing or if a mechanical or other failure has occurred, the pipe may be withdrawn from the water onto the bearings by the traction means for repair or to await more desirable launching conditions.

Once the pipe has been extended from the launch point to its final position, installation is completed by sinking the pipe to its final location.

BRIEF DESCRIPTION OF THE DRAWINGS

FIG. 1 is a schematic elevational representation of the various components of the apparatus and the pipe during assembly prior to launching;

FIG. 2A is a side view of a nine-wheel traction station for moving the pipe;

FIG. 2B is an end view showing one set of three wheels in the traction station including the adjustment and motive power for the traction wheels;

FIG. 3 is an end view of a low-friction roller bearing station;

FIG. 4A is a side view of the rolled expanded steel grate armor and attachment bands installed on a pipe section;

FIG. 4B is an end view of the armor installation on a pipe section;

FIG. 5 is a side elevational view of the deep end of the pipe assembly resting on a rapidly descending ocean bottom slope; and FIG. 6 is a top view schematic representation demonstrating launching of the completed pipe assembly using an ocean going tug and a brake assembly.

DETAILED DESCRIPTION OF THE PREFERRED EMBODIMENT

Preparation of a pipe assembly for an installation as a deep seawater feed pipe is shown schematically in FIG. 1 for a preferred embodiment of the invention. In this embodiment, high-density polyethylene (HDPE) pipe supplied by E. I. DuPont De Nemours & Company in standard lengths of 40 feet is used. Polyvinyl chloride (PVC) and other forms of thermoplastic and thermoset plastic pipe are also useful with the present invention.

In FIG. 1 a pipe 10 is assembled from the individual 40-foot sections using a fusion device 12 to connect the ends of the pipe. The fusion device is a self-contained unit which squares and prepares the pipe ends for joining, heats the pipe ends, and then provides an axial joining force welding the pipe sections together. Several fusion units are commercially available and are produced by both national and foreign suppliers.

The fusion means is located at a point "A" inland from the launch point "L", a distance equal to the length of the completely assembled pipe. As the pipe is assembled, it is supported on bearing stations 14 which provide low friction support for the pipe assembly. The plurality of bearing stations are separated by a distance "S" based on the rigidity of the pipe and structural engineering considerations to avoid excessive sag or overstressing the pipe sections or joints with resulting possible failures.

The pipe also may be assembled in subsections and then joined using one or more fusion means located along the bearing stations. Additionally, continuous pipe could be manufactured by an extrusion machine located at point A and moved along the bearing stations to the launch point.

Traction stations 16 are provided in this embodiment to move the pipe along the bearing stations during assembly and subsequently for launch of the pipe. An extraction means such as a tug boat is attached to the pipe end 18 during launching of the pipe to pull the pipe from the bearing means in combination with the traction means during launching of the pipe. A brake assembly 20 maintains tension on the pipe in opposition to the tug boat or other extraction means, when necessary, to prevent excessive lateral deformation of the pipe during launching due to ocean and meterological forces, thereby precluding failure of the pipe and handling difficulties. Cross currents, wind and wave action may cause large forces on the pipe which, while not structurally damaging the pipe, may exceed the capability of the ocean-going tug or brake station for controlling the pipe. Prediction of these factors as described subsequently is accordingly important.

For the preferred embodiment, the traction means are shown in greater detail in FIGS. 2A and 2B. As shown in FIG. 2A, the traction means comprises three sets of wheels 210 supported in a frame assembly 212. The frame assembly rests on the ground 214, and pipe sections 216 are frictionally engaged by the wheel sets providing traction power to move the pipe during assembly and launching.

FIG. 2B provides an end view of the traction station showing detail of the frame and individual wheel sets. The three wheels 218 are arranged with their planes of rotation spaced equally around the axis of the pipe. The tangency points of the wheels on the pipe are displaced laterally from the axis of the pipe a distance equal to the radius of the pipe.

In the embodiment shown, automotive wheel assemblies were used having a tire 220 providing a resilient, gripping surface for traction on the pipe, and a standard steel rim 222 rotating on a bearing 224 supported by an axle assembly 226. The upper wheel axle assembly is attached to a frame member 228 which is in turn attached to a horizontal crosspiece 230. The horizontal crosspiece is attached to the left vertical frame member 232 selectively at adjustment holes 234 using a bolt 236 or other appropriate means.

The horizontal cross member engages the right vertical member 238 through an adjustment means such as a T-handle threaded adjustment rod 240. The adjustment rod may be tightened to lever the horizontal cross member against the pin connection formed by bolt 236 thereby increasing frictional force between the tires and the pipe. Lower wheel supports 242 are adjustable along the bottom horizontal frame member 244 which in combination with adjustment of the horizontal cross member in adjustment holes 234 allows for the accommodation of various pipe diameters.

Rotational drive force for the wheels is provided through hydraulic motors 246, driving chains 248, which engage sprockets 250, attached to each wheel rim. In the preferred embodiment, the hydraulic motors are interconnected through control valving to a hydraulic pump driven by an internal combustion engine. The preferred embodiment uses a Volkswagen industrial diesel engine to provide power for the hydraulic pump. Eaton hydraulic motors and valving provide drive power and control for the wheels. Approximately 500 to 1,000 pounds of frictional thrust per wheel may be obtained to move the pipe assembly.

The pipe is moved along a plurality of bearing stations similar to that exemplified in FIG. 3. Each bearing station comprises three low-friction rollers 310A, 310B and 310C mounted on a support assembly 312. The outboard rollers 310A and 310C are mounted at a 30-degree angle or more from the horizontal to accommodate lateral forces in the pipe assembly. Standard belt conveyor troughing idlers are available from Stephens-Adamson, a division of Allis-Chalmers Co. in the desired configuration at 35 degrees for use as the bearing rollers.

Assembly of a long pipe of approximately 5,000 to 6,000 feet may not be possible in a straight line from the launch point. The inherent flexibility of a long pipe makes the use of a multiply curved route for location of the bearing stations possible. Lateral support is required in the bearing stations, however, to prevent the pipe from slipping off the bearing rollers at curves and to prevent buckling of the pipe under compressive load from the traction means. Where tight curves of the pipe are required, additional rollers may be necessary in the bearing stations to provide force against the upper half circumference of the pipe to prevent the pipe from jumping out of the bearing station.

In the preferred embodiment, approximately 150 bearing stations, spaced at 40-foot intervals, provide support for a 6,000 foot long, 16 inch diameter pipe. The weight of the assembled pipe complete with weighted armor, to be discussed in greater detail subsequently, is approximately 120,000 lbs.

A brake means as previously described in FIG. 1 is provided in the embodiment of the invention shown in FIG. 1 to maintain tension in the pipe during launching. In the present embodiment of the invention, the configuration of the brake means is similar to the traction system. A frame assembly supports three wheel sets each comprising three wheels with their rotational planes spaced equidistantly about the axis of the pipe with the tangency point of the wheels spaced radially equidistant from the axis to accommodate the pipe. The support frame for the wheels includes adjustment for varying diameters of pipe and means for adjusting the force exerted by the wheels on the pipe.

The capability to apply a rotational braking force to the wheels is accomplished in the present embodiment of the invention through the use of conventional automobile brakes mounted in the wheel assemblies. Hydraulic actuation of the brakes is accomplished through a common manifold to provide equal braking force at each wheel. In the present embodiment shown in the drawings, each brake assembly comprises three sets of three wheels mounted in the assembly frame. Those skilled in the art will recognize alternate forms of braking means equally acceptable for use in the invention. Multiple brake assemblies may be placed serially along the pipe to provide additional braking force where required.

The HDPE pipe used for deep seawater feed is slightly buoyant and, therefore, requires weighting to maintain the pipe in place on the ocean bottom. In the prior art, large anchor systems placed at a midpoint and near the end of the pipe provided one approach as previously mentioned. In this configuration, however, the pipe floats between the anchors in an inverted catenary position, and is subject to influence of deep ocean currents and, therefore, possible damage. An alternate prior art technique involved the attachment of concrete blocks spaced along the pipe sections to provide additional weight. These blocks were difficult to attach during launching of the pipe, substantially increasing the time and expense of launching the pipe.

As shown in FIGS. 4A and 4B, the present invention provides a concentric weighted armor having a threefold purpose. Expanded steel grating is rolled into half-cylindrical sections attached in pairs around the pipe as shown in FIG. 4A. The cylindrical half sections 410 and 412 are secured to the pipe using steel strapping bands 414. In the embodiment shown the armor half cylinders are ten feet in length and can be secured by steel bands at approximately three-foot intervals.

The concentric configuration of the armor allows attachment of the cylindrical half sections during the assembly of the pipe. The grating half sections increase the diameter of the pipe approximately one inch and may be drawn through the traction means during assembly and launching of the pipe.

The weighted armor provides a first function of producing negative buoyancy of the pipe. A single pair of half sections ten feet long approximately doubles the weight of a 40 foot section of pipe. Cylindrical half sections are clamped to the pipe spaced along the pipe to provide negative buoyancy thereby preventing the pipe from floating after installation.

The expanded steel grating accomplishes a second function by armoring the pipe to prevent rock abrasion caused by motion of the pipe on the ocean bottom. The armor may be placed essentially continuously at the upper and lowermost ends of the pipe and at any locations known to provide particular danger of rock abrasion. Additionally, the open weave nature of the expanded steel grating provides frictional engagement with the ocean bottom snagging rough surfaces to preclude extensive motion of the pipe.

FIG. 4B provides a cross-sectional view of the expanded steel grating armor attached to the pipe.

As shown in FIG. 5, the deep end portion of the pipe is clad with continuous armor over a portion 510 to secure the end of the pipe preventing excessive motion and precluding rock abrasion of the deep pipe. The extreme end portion 512 of the pipe is armor free, allowing the natural buoyancy of the pipe to float the pipe end 514 off the bottom to preclude bottom sand, seabottom animals or other materials from being drawn into the pipe. In the preferred embodiment, the pipe end rests approximately 2,000 feet from the surface, and the open end of the pipe floats approximately 20 feet from the bottom.

Assembly and launching of the pipe using the apparatus of the invention is best described referring to FIGS. 1 and 6. A launch point is selected and the bearing stations are spaced along a route approximately equal to the length of the completed pipe as shown in FIG. 1. The traction stations are located along the route to provide motive power for incrementally moving the pipe during the assembly process and for launching the pipe. The fusion means is located at a point distant from the launch point approximately equal to the length of the pipe. Individual pipe sections are fused together and moved onto the bearing stations incrementally as each pipe section is attached to the end of the pipe. After attachment of each section the pipe is moved incrementally one pipe length allowing the next pipe section to be fused.

The concentric weighted armor is attached conveniently at predesignated locations along the pipe by installing the half cylindrical sections of expanded steel grate to the pipe between bearing stations and securing with steel banding. The pipe is threaded through each traction means as that location is reached by the pipe. The brake system is located near the launch point and the pipe is threaded through the brake means prior to launching.

After the pipe is fully assembled, a launch time window is selected.

Prior to and during the assembly of the pipe, current monitoring and meteorological prediction is accomplished to provide data on potential wind and water currents perpendicular to the launch direction of the pipe. Drag on the floating pipeline during launching increases with the square of current velocity perpendicular to the pipe. HDPE pipes are limited to an upper operating level of 0.75 to 1 knot for a pipe of approximately 5,000 to 6,000 feet in length before structural failure becomes a risk and handling forces become excessive. Additionally, wind perpendicular to the pipe provides potentially deleterious force on the pipe in conjunction with water currents. The drag due to wind velocity on the pipe is approximately 5 to 10 percent of the drag on the pipe due to equal water current velocity. Establishing a 0.75 knot maximum for the structural integrity of the pipe would, therefore, allow a 0.5 knot water current and a 2.5 to 5 knot wind velocity of the same perpendicular vector component.

In island launching applications as exemplified by launching on the leeward side of the large island of Hawaii, current prediction must accommodate two overlying currents. The first current is a tidally driven current and is directly related to the diurnal tidal pattern with an approximate 12.4 hour frequency. The second current is generally an east to west current pattern prevalent in the northern Pacific Ocean. On the westward or leeward side of the island, the steady ocean current causes hydrodynamic eddies. These eddy currents have a relatively slow rate of change, however, when the eddy pattern shifts, the velocities of the current may exceed two knots. The eddy currents generally remain in the same direction and at the same velocity for prolonged periods of many days. Data on the eddy current pattern may be accumulated using free floating platforms such as buoys or fishing boats and correlated with fixed current meters.

The tidal-driven current, which provides a significant component parallel to shore, changes direction four times each day. This oscillating tidal current algebraically adds to the semi-steady eddy-driven currents. As a consequence of this algebraic addition and subtraction, there are times when the current may be very low, yet within 6 hours the current may be sufficiently great to present serious risks.

In the example case of the island of Hawaii, eight distinct patterns caused by the combined tidal and eddy currents have been established. Statistical data processing based on current velocity and direction data from a current meter combined with daily reports at numerous locations from free floating platforms allows 24 to 48 hour forecasting of current conditions.

Similar meteorological forecasting for wind conditions may be accomplished providing a similar forecasting capability. Such forecasting capability for current and wind velocities in combination with the capability of the apparatus of the present invention to launch a pipe within approximately a two-hour time frame provides a significantly risk reduction for potential damage for a pipe during launching. The preassembly of the pipe on land allows mobilization of required marine crews and equipment only when compatible winds and currents are forecasted.

When favorable conditions allow launching, the pipe end is attached using a collar and cable arrangement to a tug boat to be drawn into the water. The traction means of the present invention using a combination of three systems providing 27 drive wheels with 500 to 1,000 pounds of traction force per wheel, will move a 16-inch diameter pipe 6,000 feet long at approximately one foot per second.

During the initial launching stages the tug boat provides a gentle force between 3,000 and 5,000 pounds on the end of the pipe. As the pipe is drawn from the bearing means into the water and frictional forces are reduced, the braking system is used to maintain tension in the pipe to avoid sustaining excessive curvature and speed.

As shown in FIG. 6, as the pipe is drawn from the shoreline 610, currents perpendicular to the pipe, represented by arrows 612, cause drag on the pipe. The pipeline will assume a substantially catenary shape based on the perpendicular current and wind loads. Maintaining tension in the pipe by increasing drag on the brake station and increasing thrust on the tug boat tends to reduce curvature of the pipe.

Excessive curvature or kinking of the pipe is detrimental for two reasons. First, the pipe may be subjected to unacceptable bending stresses presenting a high risk of structural failure particularly in the bond joints between the pipe sections. Second, significant curvature in the pipe may preclude precise placement of the pipe during the sinking operation to achieve the desired location of the pipe.

When assembly of the pipe is completed, the launch end is capped. When the pipe has been fully extracted from the brake means during launching, the trailing end is capped and the pipe assembly is pressurized to assist in maintaining rigidity of the pipe. Standard blind flange seals, pressure valving and pressure relief systems may be used to accommodate this requirement.

Additional rigidity in the pipe provided by pressurization, as previously discussed, also assists in preventing excessive curvature of the pipe.

After the pipe has been drawn into the water its full length and positioned, the pipe is sunk by filling with seawater.

While the preferred embodiment has been described with respect to launching of deep seawater feed pipes, the apparatus and method of the invention are equally applicable to placement of submerged river-crossing pipelines. Additionally, the apparatus of the invention may be employed for relining of existing pipes by constructing a reduced diameter pipeline assembled from a starting location to a desired length and then inserted by using the traction stations to move the assembled pipe along the bearing stations and telescopically into the existing pipe. Applications such as relining sewer systems with new HDPE pipe or relining existing HDPE pipelines for additional wall thickness may be accommodated in this fashion.

Having now described the invention in detail as required by the patent statutes, those skilled in the art will have no difficulty in modifying or rearranging the elements of the invention to meet specific needs. Such modifications remain within the intent and scope of the invention as set forth in the following claims.

What is claimed is:

1. An apparatus for assembling a long pipe on land and rapidly launching the pipe into a body of water in a single, substantially continuous operation comprising:
   a plurality of bearing means having bases capable of mounting on unprepared ground surface, arranged in spaced relation from a launch point to an end point located inland the approximate length of the completed pipe; and,
   at least one traction means for concentric frictional engagement of the pipe to provide selectably continuous longitudinal force axially along the pipe, the traction means aligned with the bearing means and coaxially located between the end point and the launch point to receive the pipe through the traction means for moving the pipe along the bearing means.

2. An apparatus as defined in claim 1 further comprising extraction means for guiding the pipe from the bearing means beyond the start point and capable of supplementing the force supplied by the traction means.

3. An apparatus as defined in claim 2 further comprising a stationary brake means aligned with the bearing means and concentrically engaging the pipe for maintaining tension on the pipe in opposition to the extraction means.

4. An apparatus as defined in claim 3 wherein the brake means comprises:
   at least one set of at least two wheels having resilient surfaces, the rotational planes of the wheels spaced around a central axis, the tangency point of the wheels spaced radially equidistant from the axis to accommodate a circular pipe therebetween;
   support means for the set of wheels;
   means for applying force to the wheels radially inward toward the axis inducing frictional engagement with the pipe; and
   means for providing rotational braking force to the wheels.

5. An apparatus as defined in claim 3 for assembling and launching a long pipe further comprising:
   concentric weighted armor attachable to the pipe at selected intervals for abrasion protection, the concentric armor comprising cylindrical sections of expanded metal grate rolled to conform to the diameter of the pipes which are joined about the pipe and constrained in close engagement with the pipe conforming to the shape of the pipe allowing the armor to transition through the reaction means, the expanded metal grate further providing a serrated surface for engaging a rough ocean bottom to stabilize the submerged pipe.

6. An apparatus as defined in claim 3 wherein the brake means and any bearing means intermediate the brake means and the launch point thereby allowing curved placement of bearing means intermediate the brake means and end point.

7. An apparatus as defined in claim 3 wherein the brake means is capable of applying a continuous braking force to the pipe.

8. An apparatus as defined in claim 3 for assembling and launching a long pipe further comprising:
   concentric weighted armor attachable to the pipe at selected intervals for abrasion protection, the concentric armor comprising half cylinder sections of expanded metal grate rolled to half cylinders which are joined about the pipe and encircled with bands to constrain the half cylinders in close engagement with the pipe, the expanded metal grate providing a serrated surface for engaging a rough ocean bottom to stabilize the submerged pipe.

9. An apparatus as defined in claim 2 wherein the extraction means for guiding the pipe from the starting point comprises a tug boat for guiding the pipe during the launch from the bearing means supplementing the force provided by the traction means and maintaining the pipe in its proper offshore position.

10. An apparatus as defined in claim 1 wherein the traction means comprises a plurality of rotating drive means for exerting force longitudinally along the pipe and means for frictionally interengaging the pipe and the drive means.

11. An apparatus as defined in claim 10 wherein the plurality of rotating drive means comprises at least six wheels combined in sets of three wheels spaced about a common axis, the tangency points of the wheels displaced equally from the axis to accommodate a circular pipe therebetween;
    support means for the sets of wheels;
    means for urging the wheels toward the axis for frictional engagement with the pipe; and,
    power means for providing rotational force to the wheels.

12. An apparatus as defined in claim 11 wherein the traction means comprises a plurality of traction stations disbursed at points intermediate the bearing means for providing distributed traction force to the pipe allowing placement of the bearing stations along a curved route and wherein the power means are reversible to provide opposite rotational force to the wheels.

13. An apparatus as defined in claim 10 wherein the traction means comprises:
    at least one set of at least two resiliently surfaced wheels spaced about a common axis, the tangency points of the wheels displaced equally from the axis to accommodate a circular pipe therebetween;
    support means for the set of wheels;
    means for urging the wheels toward the axis for frictional engagement with the pipe; and
    drive means for providing rotational force to the wheels.

14. An apparatus as defined in claim 10 wherein the traction means are reversible.

15. An apparatus as defined in claim 1 wherein the pipe is constructed from individual sections which are plastic material and further comprising means intermediate the end point and the traction means for preparing and joining the trailing edge of the assembled pipe sections to the leading edge of the next pipe section to be attached.

16. A method for launching a long pipe assembly into a body of water comprising:
    placing a plurality of bearing means in spaced relation back from a launch point on the shore the approximate length of the completed pipe assembly;
    locating at least one traction means aligned coaxially with the bearing means and interspersed with the bearing means for moving the pipe along the bearing means;
    inserting the pipe through the traction means, and operating the traction means to move the pipe substantially continuously along the bearing means and beyond the start point to a final extended location.

17. A method for launching a long pipe as defined in claim 16 wherein the extended location of the pipe is in the body of water and further comprises predicting lateral loads on the pipe due to currents, winds, and other natural forces in the water beyond the launch point prior to moving the pipe from on shore to the final extended location.

18. A method for launching a long pipe as defined in claim 17, further comprising continuing to predict currents and winds during movement of the pipe from on shore to the final extended location.

19. A method as defined in claim 18 further comprising the steps of;
   determining if lateral loads on the pipe will be exceeded by existing currents and wind velocities during the launch; and,
   withdrawing the pipe if lateral loads are in danger of being exceeded prior to completion of launching and sinking of the pipe.

20. A method for assembling and moving a long pipe constructed from individual pipe sections comprising:
   placing a plurality of bearing means in spaced relation back from a start point the approximate length of the pipe;
   locating a connection means for connecting the pipe sections at the beginning of the bearing means distal from the start point;
   inserting the pipe sections through a traction means coaxially aligned with the bearing means;
   connecting pipe sections using the connection means;
   interruptably moving the pipe along the bearing means using the traction means until the entire pipe is assembled; and
   moving the pipe rapidly and substantially continuously along the bearing means and beyond the start point to a final extended location.

21. A method for launching a long pipe comprising:
   placing a first plurality of bearing means in spaced relation back from a launch point the approximate length of the pipe;
   locating a fusion means for connecting pipe sections at the beginning of the bearing means distal from the launch point;
   locating a second plurality of traction means coaxially aligned with and interspersed among the bearing means;
   interruptably operating the traction means to move the pipe along the bearing means until the entire pipe is completed by connecting pipe sections using the fusion means;
   propelling the pipe substantially continuously and rapidly along the bearing means, and beyond the launch point;
   guiding the pipe during the launch and supplementing the traction means using a tug boat;
   maintaining tension on the pipe opposing the force applied by the tug boat; and
   sinking the pipe.

22. A method as defined in claim 21 further comprising:
   capping the seaward end of the pipe;
   capping the landward end of the pipe; and
   pressurizing the pipe after drawing the pipe into the water to increase the axial rigidity of the pipe to assist in positioning and sinking.

23. A method as defined in claim 21 further comprising predicting the lateral loads due to currents, winds and other natural forces in the water at the launch point prior to drawing the pipe into the water.

24. A method as defined in claim 23 further comprising continuing to predict the lateral loads due to currents, winds and other natural forces in the water near the launch point during the launching of the pipe.

25. A method for launching a long pipe as defined in claim 21, further comprising the step of attaching concentric weighted armor to the pipe prior to launching.

26. A method for launching a long pipe comprising:
   placing a first plurality of bearing means in spaced relation back from a launch point the approximate length of the pipe;
   locating a fusion means for connecting pipe sections at the beginning of the bearing means distal from the launch point;
   locating a second plurality of traction means interspersed among the bearing means;
   interruptably operating the traction means to move the pipe along the bearing means until the entire pipe is completed by
   connecting pipe sections using the fusion means and
   attaching concentric weighted armor to the pipe;
   predicting the lateral loads due to currents, winds and other natural forces in the water at the launch point prior to drawing the pipe into the water by
   establishing a statistical database of prevailing currents and wind velocities;
   determining acceptable force values on the pipe;
   measuring prevailing currents over a time period;
   measuring wind velocity over the time period;
   comparing established statistical database values with the time period values;
   estimating near-term future values based on the statistical database;
   calculating diurnal tide current contribution;
   calculating wind force contribution equivalent;
   algebraically adding prevailing current, tide current, and wind contribution;
   comparing near-term values with acceptable values for the pipe; and
   commencing launching operations if near-term values are acceptable;
   propelling the pipe continuously and rapidly along the bearing means and into the water from the launching point;
   guiding the pipe into the water and supplementing the traction means using a tug boat;
   maintaining tension on the pipe opposing the force applied by the tug boat;
   capping the seaward end of the pipe:
   capping the landward end of the pipe;
   pressurizing the pipe after drawing the pipe into the water to increase rigidity of the pipe; and,
   sinking the pipe.

27. A method for launching a deep ocean water feed pipe comprising:
   placing bearing means in spaced relation back from a launch point the approximate length of the pipe;
   locating a fusion means for connecting the pipe sections at the beginning of the bearing means distal from the launch point;
   interruptibly moving the pipe along the bearing means until the entire pipe is complete;
   connecting pipe sections using the fusion means and attaching concentric weighted armor to the pipe;
   predicting the lateral loads due to currents, winds and other natural forces in the water at the launch point wherein predicting of the lateral loads comprises
   establishing a statistical data base of prevailing currents and wind velocities,
   determining acceptable force values on the pipe, measuring prevailing currents over a time period,
measuring wind velocity over the time period,
comparing established statistical data base values with the time period values,
estimating near term future values based on the statistical data base,
calculating the diurnal tide current distribution,
calculating wind force contribution equivalent algebraically adding prevailing current tide current and wind contribution, and,
comparing near term values with acceptable values for the pipe;
continuing to predict the lateral loads due to currents, winds and other natural forces in the water near the launch point during the launching of the pipe; and,
sinking the pipe.

28. A method for providing cold biologically inactive seawater for mariculture applications comprising:
placing a first plurality of bearing means in spaced relation back from a launch point a distance equalling the approximate length of sloped ocean bed to a depth sufficient to obtain suitable water;
locating a means for connecting pipe sections at the beginning of the bearing means distal from the launch point;
locating a second plurality of traction means interspersed among the bearing means;
loading pipe sections onto the bearing means proximate the means for connecting the pipe sections;
interruptably operating the traction means to move the pipe along the bearing means until the entire pipe is completed by connecting pipe sections using the means for connecting the pipe sections;
attaching armor to the pipe;
propelling the pipe substantially continuously and rapidly along the bearing means and into the water from the launching point;
guiding the pipe into the water and supplementing the traction means using a tug boat;
maintaining tension on the pipe opposing the force applied by the tug boat;
sinking the pipe;
attaching a pump to the exposed end of the pipe at the launch point; and,
pumping water for use in the mariculture application.

* * * * *